United States Patent [19]
De Marco et al.

[11] 4,024,359
[45] May 17, 1977

[54] CONTINUITY-CHECKING NETWORK FOR TELECOMMUNICATION SYSTEM

[75] Inventors: Franco De Marco, Milan; Gualtiero Rigo, Settimo Milanese (Milan), both of Italy

[73] Assignee: Societa Italiana Telecomunicazioni Siemens S.p.A., Milan, Italy

[22] Filed: Feb. 11, 1976

[21] Appl. No.: 657,263

[30] Foreign Application Priority Data

Feb. 12, 1975  Italy .................................. 20181/75

[52] U.S. Cl. .................. 179/175.3 R; 179/175.2 R
[51] Int. Cl.² .......................................... H04B 3/46
[58] Field of Search ............... 179/175.3 R, 175.23, 179/175.2 R

[56] References Cited
UNITED STATES PATENTS

| | | | |
|---|---|---|---|
| 3,138,670 | 6/1964 | Maurushat et al. | 179/175.3 R |
| 3,626,383 | 12/1971 | Oswald et al. | 179/175.2 R |
| 3,691,309 | 9/1972 | Gartner et al. | 179/175.23 |
| 3,851,122 | 11/1974 | Gibson | 179/175.23 |
| 3,860,769 | 1/1975 | Pachynski | 179/175.3 R |
| 3,937,908 | 2/1976 | Funk et al. | 179/175.2 R |

*Primary Examiner*—Douglas W. Olms
*Attorney, Agent, or Firm*—Karl F. Ross; Herbert Dubno

[57] ABSTRACT

A marker at a central-office terminal, controlling the establishment of connections between local subscriber lines and inter-office links via an associated line concentrator/distributor, includes a test-signal generator connected via a two-way coupler to an outgoing branch of an engaged link, a first signal receiver connected by the coupler to an incoming branch of that link, and a second signal receiver inserted in a normally balanced phantom circuit formed by incoming and outgoing branches of a local line communicating with the link. Upon the establishment of a connection including such a link between two subscriber lines served by respective central-office terminals, an alternating test signal generated at one terminal must be detected with a predetermined minimum threshold by the first receiver but not by the second receiver of the other terminal before message transmission over this connection can be initiated.

4 Claims, 1 Drawing Figure

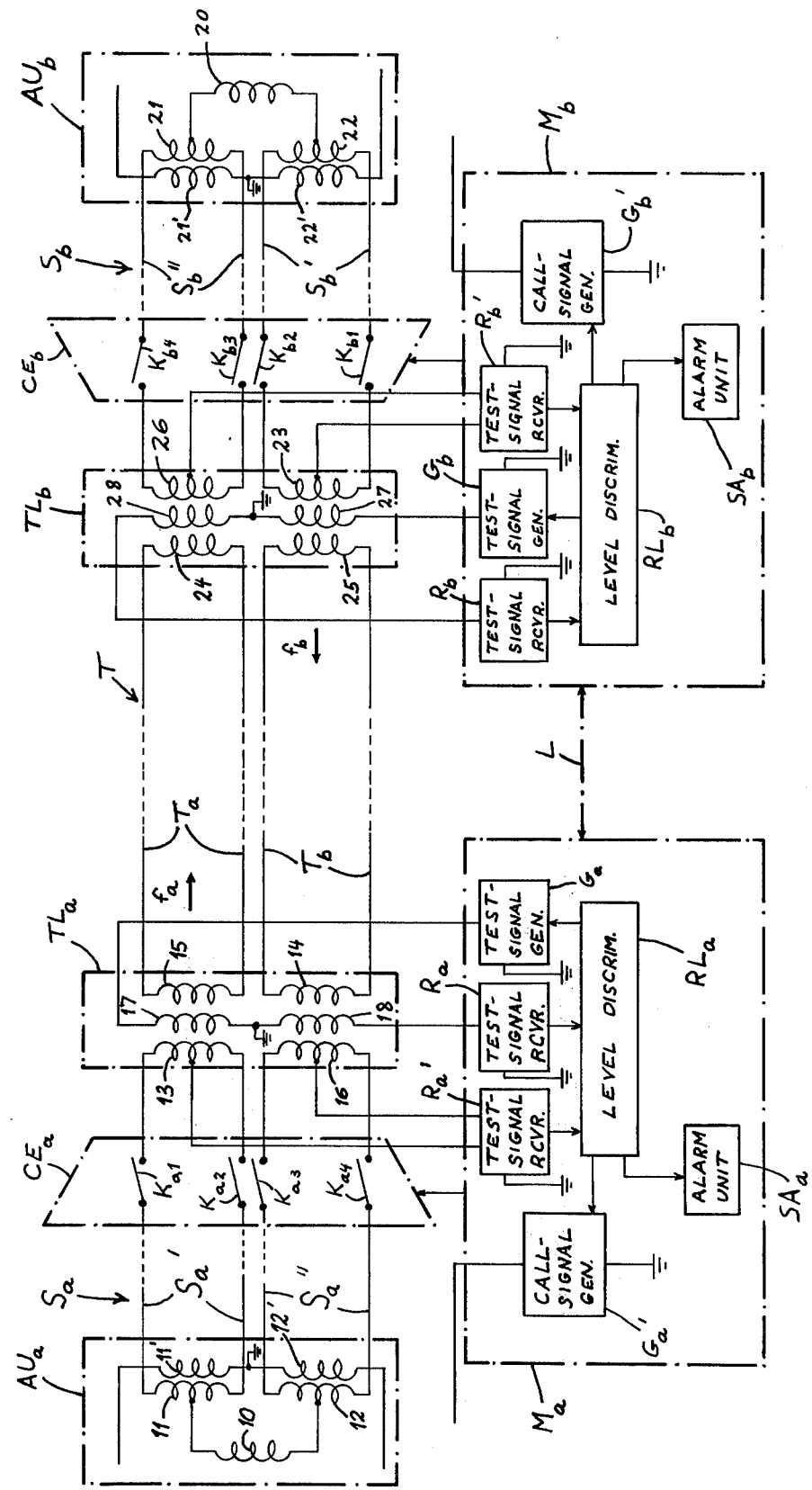

CONTINUITY-CHECKING NETWORK FOR TELECOMMUNICATION SYSTEM

FIELD OF THE INVENTION

Our present invention relates to a telecommunication system, designed to transmit speech and/or data, wherein a multiplicity of local subscriber lines served by a central office are selectively connectable to a lesser number of inter-office links for making outgoing calls to or receiving incoming calls from subscribers served by another central office or exchange.

BACKGROUND OF THE INVENTION

In such a system it is known to employ, at a switching terminal of a central office, a switch marker controlling a line concentrator/distributor which on an outgoing call connects the line of the calling subscriber to an available trunk or other inter-office link and on an incoming call connects a designated link to a selected local subscriber line; see, for example, U.S. Pat. No. 3,328,534. The markers at the intercommunicating terminals are interconnected via a common signal path which carries the information relating to existing or desired connections between a given link and a local subscriber line. The line concentrator/distributor (simply referred to hereinafter as a line concentrator), inserted between $n$ subscriber lines and $m$ links where $m$ is substantially smaller than $n$, comprises a multiplicity of switches whose selective closure thus allows up to $m$ conversations to be carried out simultaneously. The marker, as a central component, communicates with the local lines and the inter-office links through the intermediary of peripheral units such as test circuits and couplers.

Since the establishment of a connection for the exchange of messages between the lines of the calling and called subscribers takes place independently of the inter-office line selected for a particular call, it behooves to check the continuity of the links before terminating this phase of operation, i.e. before releasing the centralized components involved and summoning the called party. Thus, if the link is found to be defective, or if the switches of the line concentrator at either end thereof do not properly couple that link to the corresponding local line, corrective measures will have to be taken, as by reoperating the connectors for another try, selecting a different link and/or emitting an alarm signal. The operation of a call-signal generator for the transmission of ringing current to the called subscriber station may also be made conditional upon a verification of continuity.

Such verification is particularly important in the case of certain subscribers, e.g. airlines or banks, which must have reliable telecommunication service available at all times.

OBJECTS OF THE INVENTION

An object of our present invention, therefore, is to provide means in such a telecommunication system for effectively checking the continuity of a trunk or other link through which message transmission is to take place between a calling and a called subscriber.

It is also an object of our invention to provide, in such a system, means for ascertaining the integrity of the connection between the selected link and the local lines to be coupled thereto.

A further object of our invention is to accomplish the aforedescribed checking operations without physically encumbering an engaged link with switches that could impair its fidelity of message transmission and might increase the likelihood of malfunction.

SUMMARY OF THE INVENTION

We realize these objects, in accordance with our present invention, by the provision of a test-signal generator at each central-office terminal for sending a predetermined test frequency to the remote terminal at the other end of the selected link, this generator being connectable to an outgoing branch of the link whose incoming branch is connectable to a test-signal receiver responsible to a predetermined test frequency from the other terminal. The receiver works into a level discriminator which emits a verification signal in response to the arrival of a test frequency from the other terminal attaining a predetermined lower intensity limit.

Pursuant to another feature of our invention, there is also provided at each terminal an ancillary signal receiver which is insertable in a phantom circuit formed by a transmitting and a receiving branch of the local line coupled to the selected link, this phantom circuit being substantially balanced upon proper closure of the line-concentrator switches establishing that connection. In this balanced condition, only a negligible or zero component of the arriving test frequency can be picked up by the ancillary receiver whose output is also fed to the level discriminator for enabling the emission of a verification signal only as long as that output falls short of a predetermined upper intensity limit.

According to a more particular feature of our invention, the connection between a local line and a link includes two coupling transformers provided with primary, secondary and tertiary windings, the tertiary winding of one transformer being connected across the test-signal generator while the tertiary winding of the other transformer is connected across the principal test-signal receiver. The phantom circuit feeding the ancillary receiver comprises a conductive termination connected across the conductors of each local-line branch at an end remote from the associated terminal, i.e. within the corresponding subscriber station, these terminations being preferably in the form of inductances and having conductively interconnected midpoints to balance the connection of the ancillary signal receiver between center taps of one transformer primary and one transformer secondary. The conductive connection between these midpoints may include a further inductance.

BRIEF DESCRIPTION OF THE DRAWING

The above and other features of our invention will now be described in detail with reference to the accompanying drawing the sole FIGURE of which is a block diagram of a telecommunication system including two terminals provided with continuity-checking means according to the invention.

SPECIFIC DESCRIPTION

The telecommunication system shown in the drawing is generally similar to a system described in a commonly owned application filed on even date herewith by Gualtiero Rigo and Carlo Alberto Manghi, Ser. No. 657,389, including two line concentrators $CE_a$ and $CE_b$ which form part of respective central-office terminals each serving a large group of local subscriber lines that can be selectively connected to a smaller number of inter-office links. The disclosure of that copending application is hereby inserted by reference into our present application. Only one subscriber station associated with each terminal has been illustrated, i.e. a station $AU_a$ connected to line concentrator $CE_a$ via a local line $S_a$ and a station $AU_b$ similarly connected to line concentrator $CE_b$ by way of local line $S_b$. Of the several links or trunks extending between the two terminals, we show only a single trunk T. That trunk, which is representative of all the others, comprises two branches for the transmission of messages (speech or data) in opposite directions, branch $T_a$ being the outgoing one and branch $T_b$ being the incoming one as seen from the left-hand terminal including line concentrator $CE_a$. Each of these branches consists, at least in the vicinity of its terminals, of two conductors interconnected by a transformer winding. Between these extremities the trunk may include conventional means, not further illustrated, common to several trunks for transmitting their messages in a frequency-division mode via respective carriers. Each local line includes a transmitting branch and a receiving branch respectively designated $S_a'$, $S_a''$ in the case of line $S_a$ and $S_b'$, $S_b''$ in the case of line $S_b$. Each of the line branches has a pair of throughgoing conductors bridged at the subscriber station by a respective inductance coil 11, 12 or 21, 22, the midpoints of these coils being interconnected by further coils 10 and 20. Coils 11, 12 and 21, 22 are inductively coupled with transformer windings 11', 12' and 21', 22' leading to nonillustrated voice and/or data transmitters and receivers within the respective station.

Line concentrators $CE_a$, $CE_b$ comprise each a set of switches for selectively establishing, under the control of associated markers $M_a$ and $M_b$, a message-communication circuit between any local line and a specific trunk in response to the initiation of a call (closure of hook switch) by a local subscriber or the reception of dialing information from the remote marker via a signal path L, as is well known per se. The switches of line concentrator $CE_a$ serving to couple the line $S_a$ to the trunk T comprise a first connector pair $K_{a1}$, $K_{a2}$ in transmitting branch $S_a'$ and a second connector pair $K_{a3}$, $K_{a4}$ in receiving branch $S_a''$. In an analogous manner, two connector pairs $K_{b1}$, $K_{b2}$ and $K_{b3}$, $K_{b4}$ are inserted in the conductors of branches $S_b'$ and $S_b''$ within line concentrator $CE_b$ for coupling the line $S_b$ to the trunk T.

Upon the closure of switches $K_{a1}$ and $K_{a2}$, transmitting branch $S_a'$ is coupled to trunk branch $T_a$ through one of two line transformers collectively designated $TL_a$, this transformer comprising a primary winding 13, a secondary winding 15 and a tertiary winding 17. Similarly, closure of switches $K_{b1}$ and $K_{b2}$ couples the transmitting branch $S_b'$ to trunk branch $T_b$ by way of one of two transformers collectively designated $TL_b$, that transformer including a primary winding 23, a secondary winding 25 and a tertiary winding 27. The other transformer of pair $TL_a$, serving to couple the trunk branch $T_b$ to the receiving branch $S_a''$, comprises a primary wnding 14, a secondary winding 16 and a tertiary winding 18; the corresponding transformer of pair $TL_b$, designed to couple the trunk branch $T_a$ to receiving branch $S_b''$, comprises a primary winding 24, a secondary winding 26 and a tertiary winding 28.

Tertiary windings 17 and 27 are connected across the outputs of respective test-signal generators $G_a$ and $G_b$ in markers $M_a$ and $M_b$. The other tertiary windings 18 and 28 are connected across the inputs of respective principal test-signal receivers $R_a$ and $R_b$ in these markers. An ancillary test-signal receiver $R_a'$ in marker $M_a$ has its input connected across respective center taps of transformer windings 13 and 16; analogously, an ancillary test-signal receiver $R_b'$ in marker $M_b$ has input connections to center taps of windings 23 and 26. Receivers $R_a$, $R_a'$ and $R_b$, $R_b'$ work into respective logic networks $RL_a$ and $RL_b$ which are programmed to control the associated generators $G_a$ and $G_b$ in a manner described hereinafter and which include each a signal-level discriminator designed to compare the outputs of the test-signal receivers with predetermined thresholds constituting a lower intensity limit in the case of receivers $R_a$, $R_b$ and an upper intensity limit in the case of receivers $R_a'$, $R_b'$.

Logic networks $RL_a$ and $RL_b$ also control, within their respective markers, alarm units $SA_a$, $SA_b$ of the type described in the commonly owned Rigo/Manghi application Ser. No. 657,389 of even date, as well as conventional call-signal generators $G_a'$, $G_b'$ designed to send ringing current to a local subscriber station receiving an incoming call.

Let us assume that the subscriber at station $AU_a$ wishes to call the subscriber at station $AU_b$. Closure of a hook switch, detected by a nonillustrated line monitor, causes the marker $M_a$ to allocate an available link such as the trunk T to the local line $S_a$ and to inform the distant marker $M_b$, via signal path L, of the identity of the called subscriber (e.g. on the basis of dial pulses transmitted via coupler $TL_a$ to trunk T and picked up by a nonillustrated further transformer winding). Marker $M_b$ then commands the line concentrator $CE_b$ to extend the connection from the designated trunk T to the selected subscriber line $S_b$ whereupon network $RL_b$ within that marker activates the signal generator $G_b$ to produce the characteristic test frequency $f_b$. If the trunk branch $T_b$ is intact, that frequency is detected within marker $M_a$ by receiver $R_a$ with a level of intensity exceeding the corresponding threshold established by the discriminator in network $RL_a$.

The test signal appearing in transformer primary 14, delivered to receiver $R_a$ via tertiary winding 18, is also picked up by secondary winding 16 for transmission over the line loop $S_a''$ closed by switches $K_{a3}$ and $K_{a4}$. Since the midpoints of coils 16 and 12 are mutually conjugated, little or no voltage from that signal is generated in coil 10 if both switches are properly closed. If, however, one of these switches happens to be open, the phantom circuit including windings 11, 12, 13 and 16 is unbalanced so that a component of the test signal $f_b$ reaches the receiver $R_a'$ with an intensity exceeding the corresponding threshold whereby network $RL_a$ is prevented from emitting the requisite verification signal. Thus, such a signal is produced only if the output of receiver $R_a$ is above and the output of receiver $R_a'$ is below the respective threshold level.

The verification signal produced within the control network $RL_a$ at the calling-line terminal activates the test-signal generator $G_a$ which thereupon transmits the characteristic frequency $f_a$ by way of transformer windings 17, 15 and trunk branch $T_a$ to the called-line terminal for energization of winding 28 and receiver $R_b$. Network $RL_b$ now performs the same checks that have been described with reference to network $RL_a$, i.e. it ascertains whether the outputs of signal receivers $R_b$ and $R_b'$ have intensities above and below respective threshold levels. If that check is positive, indicating the continuity of trunk branch $T_a$ and the proper closure of switches $K_{b3}$, $K_{b4}$, network $RL_b$ emits its own verification signal which activates the call-signal generator $G_b'$ and is also sent back via path L to marker $M_a$ for informing same that the connection has been perfected. The link allocators of the two markers are now available for other tasks.

As described in another commonly owned application of even date, Ser. No. 657,388 filed by Giorgio Biraghi and Carlo Alberto Manghi, the phantom circuits extending between the subscriber stations and the central-office terminals may also be used for checking the operational mode of a subscriber station with the aid of direct-current signals of reversible polarity transmitted from the markers to the subscriber stations and detected by associated level sensors. In that instance the conductive connection between the midpoints of coils 11, 12 and 21, 22 may include a diode in series with a resistor, shunted by a normally open hook switch, resulting in the rectification and attenuation of any unbalance signal in the case of a called subscriber whose hook switch is still open. Naturally, this enfeeblement of a trouble-indicating signal component would have to be taken into account in setting the threshold for the ancillary test-signal receiver of a marker responding to a call from a remote station (i.e. receiver $R_b'$ in the example considered above).

The circuitry hereinabove described may be used in a telecommunication system with hot-line connections, i.e. with markers programmed to connect a certain subscriber line of one terminal invariably with a specific subscriber line of another terminal, as disclosed and claimed in commonly owned application Ser. No. 440,450 filed Feb. 7 1974 by Luigi Falcone.

We claim:

1. In a telecommunication system with two terminals interconnected by at least one link having an outgoing branch and an incoming branch, a local line at each terminal with a transmitting branch and a receiving branch, and switch means for respectively connecting the transmitting and receiving branches of said local line at each of said terminals to the outgoing and incoming branches of said link to facilitate the exchange of messages between the local lines associated with said terminals, the combination therewith of continuity-checking means at each of said terminals comprising:
    a test-signal generator connected to said outgoing branch for sending a predetermined test frequency to the other terminal;
    a test-signal receiver, responsive to a predetermined test frequency from the other terminal, connected to said incoming branch;
    a level discriminator connected to said test-signal receiver for emitting a verification signal in response to a test frequency arriving from the other terminal and attaining a predetermined lower intensity limit; and
    an ancillary signal receiver inserted in a phantom circuit formed by the transmitting and receiving branches of the associated local line, said phantom circuit being substantially balanced upon proper closure of said switch means for minimizing a component of said arriving test frequency picked up by said ancillary signal receiver, said level discriminator being further connected to said ancillary signal receiver for emitting said verification signal only upon said component falling short of a predetermined upper intensity limit.

2. The combination defined in claim 1 wherein each terminal further comprises a first transformer coupling the transmitting branch of said local line to the outgoing branch of said link and a second transformer coupling the incoming branch of said link to the receiving branch of said local line, said transmitting branch including a pair of conductors connected across a primary winding of said first transformer, said outgoing branch comprising a pair of conductors connected across a secondary winding of said first transformer, said incoming branch including a pair of conductors connected across a primary winding of said second transformer, said receiving branch including a pair of conductors connected across a secondary winding of said second transformer, said first transformer being further provided with a tertiary winding connected across said test-signal generator, said second transformer being further provided with a tertiary winding connected across said test-signal receiver.

3. The combination defined in claim 2 wherein said phantom circuit comprises a conductive termination connected across the conductors of each branch of said local line at an end remote from the associated terminal, said ancillary signal receiver being connected across respective center taps of the primary winding of said first transformer and the secondary winding of said second transformer, said phantom circuit including a conductive connection between respective center taps of the conductive terminations of the branches of said local line.

4. The combination defined in claim 3 wherein said conductive terminations and said conductive connection are inductances.

* * * * *